H. W. FODDY
N. J. FUGAZZI
INVENTOR.

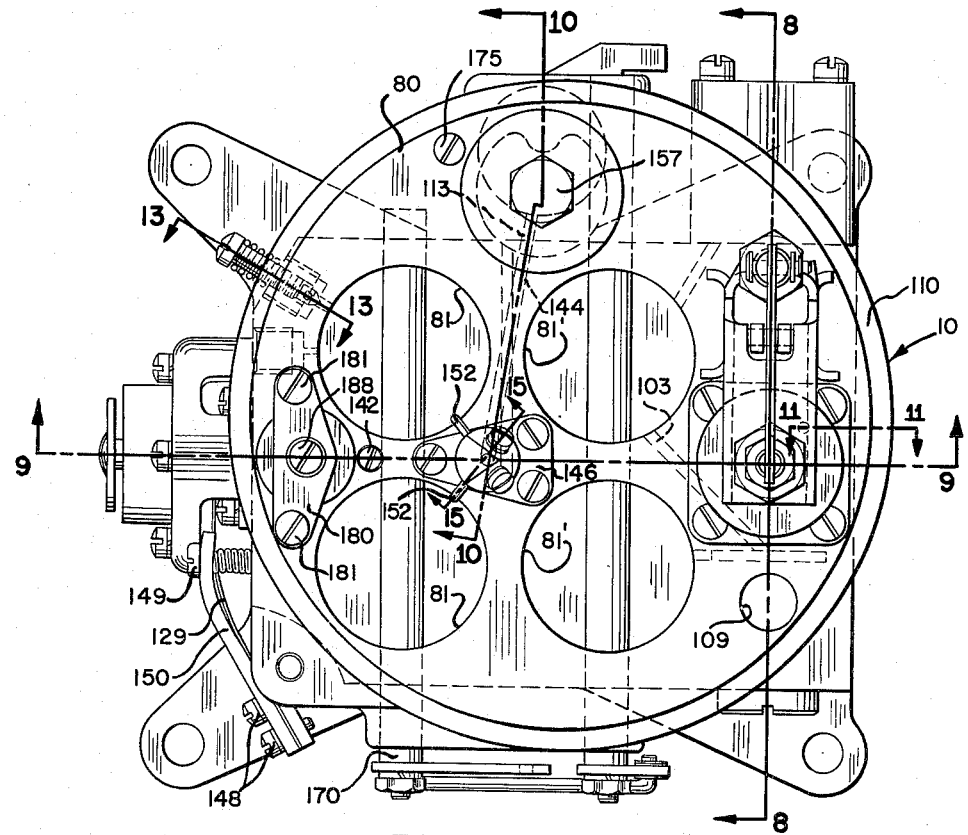
FIG. 6
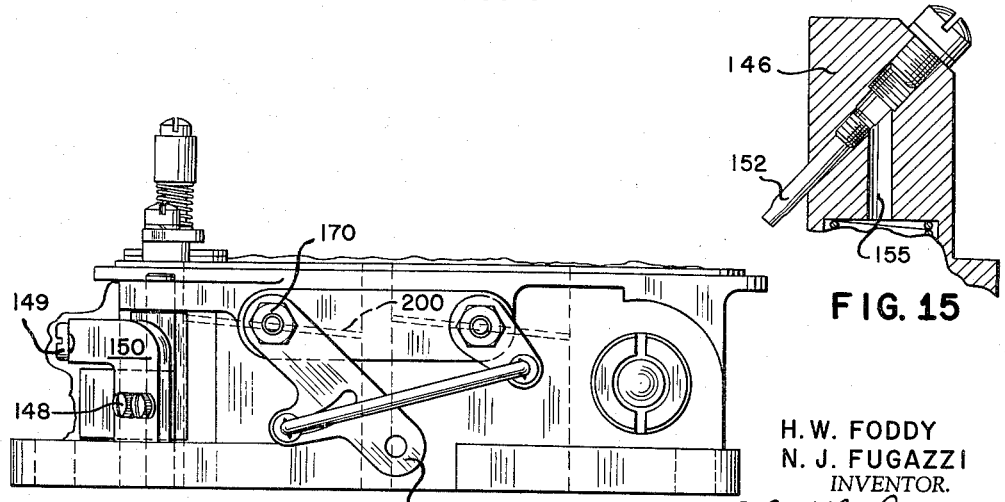
FIG. 7
FIG. 15
H. W. FODDY
N. J. FUGAZZI
INVENTOR.
BY E.C. McRae
J. R. Faulkner
G. H. Oster
G. N. Henderson
ATTORNEYS Aug. 22, 1961     H. W. FODDY ET AL     2,997,037
FUEL INJECTION CONTROL SYSTEM
Filed Aug. 7, 1958     8 Sheets-Sheet 6
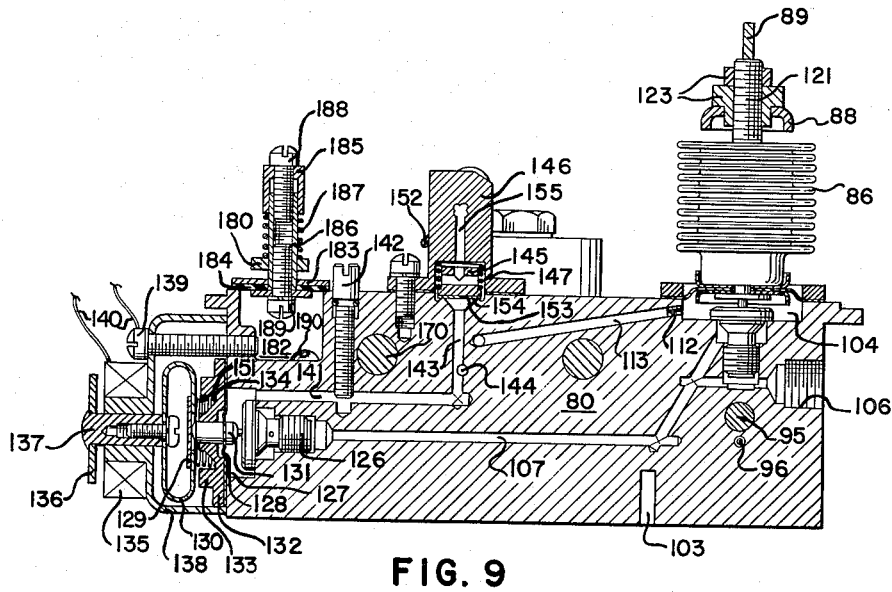
FIG. 9
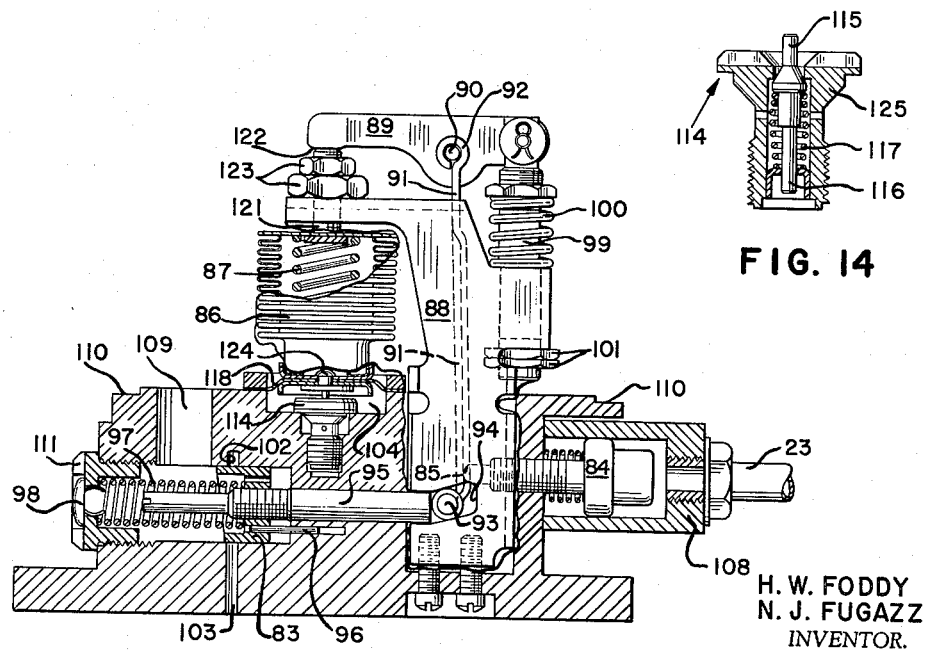
FIG. 8
FIG. 14
H. W. FODDY
N. J. FUGAZZI
INVENTOR.
BY E.C. McRae
J.R. Faulkner
J.H. Oster
J.W. Henderson
ATTORNEYS Aug. 22, 1961   H. W. FODDY ET AL   2,997,037
FUEL INJECTION CONTROL SYSTEM
Filed Aug. 7, 1958   8 Sheets-Sheet 7

BY E. C. McRae
J. B. Faulkner
F. H. Oster
G. N. Henderson
ATTORNEYS

Aug. 22, 1961     H. W. FODDY ET AL     2,997,037
FUEL INJECTION CONTROL SYSTEM

Filed Aug. 7, 1958     8 Sheets-Sheet 8

H. W. FODDY
N. J. FUGAZZI
INVENTOR.

BY E. C. McRae
J. R. Faulkner
T. H. Oster
G. N. Henderson
ATTORNEYS

United States Patent Office 2,997,037
Patented Aug. 22, 1961

2,997,037
FUEL INJECTION CONTROL SYSTEM
Harold W. Foddy, Dearborn, and Nolan J. Fugazzi, Livonia, Mich., assignors to Ford Motor Company, Dearborn, Mich., a corporation of Delaware
Filed Aug. 7, 1958, Ser. No. 753,663
12 Claims. (Cl. 123—119)

This invention pertains to fuel injection control systems and more particularly to a fuel requirement computing system for internal combustion engines.

A principal object of this invention is the provision of an integrated fuel system which supplies the requirements of an internal combustion engine taking into regard engine load, altitude, ambient air temperature and engine temperature.

A further object is the provision of an anti-stall arrangement for use in a fuel injection system whereby additional fuel and air is admitted to the engine's induction system upon conditions which would, but for the additional fuel and air, cause the engine to stall.

A further object is the provision of an engine primer which supplies fuel in metered quantities to the induction system to provide dependable engine starts over a wide range of engine and ambient air temperatures.

A further object is the provision of a unitary servo control system whereby a servo-operating fluid pressure is pressure regulated in varying amounts in accordance with engine temperature and ambient air temperature and pressure.

Figure 1:
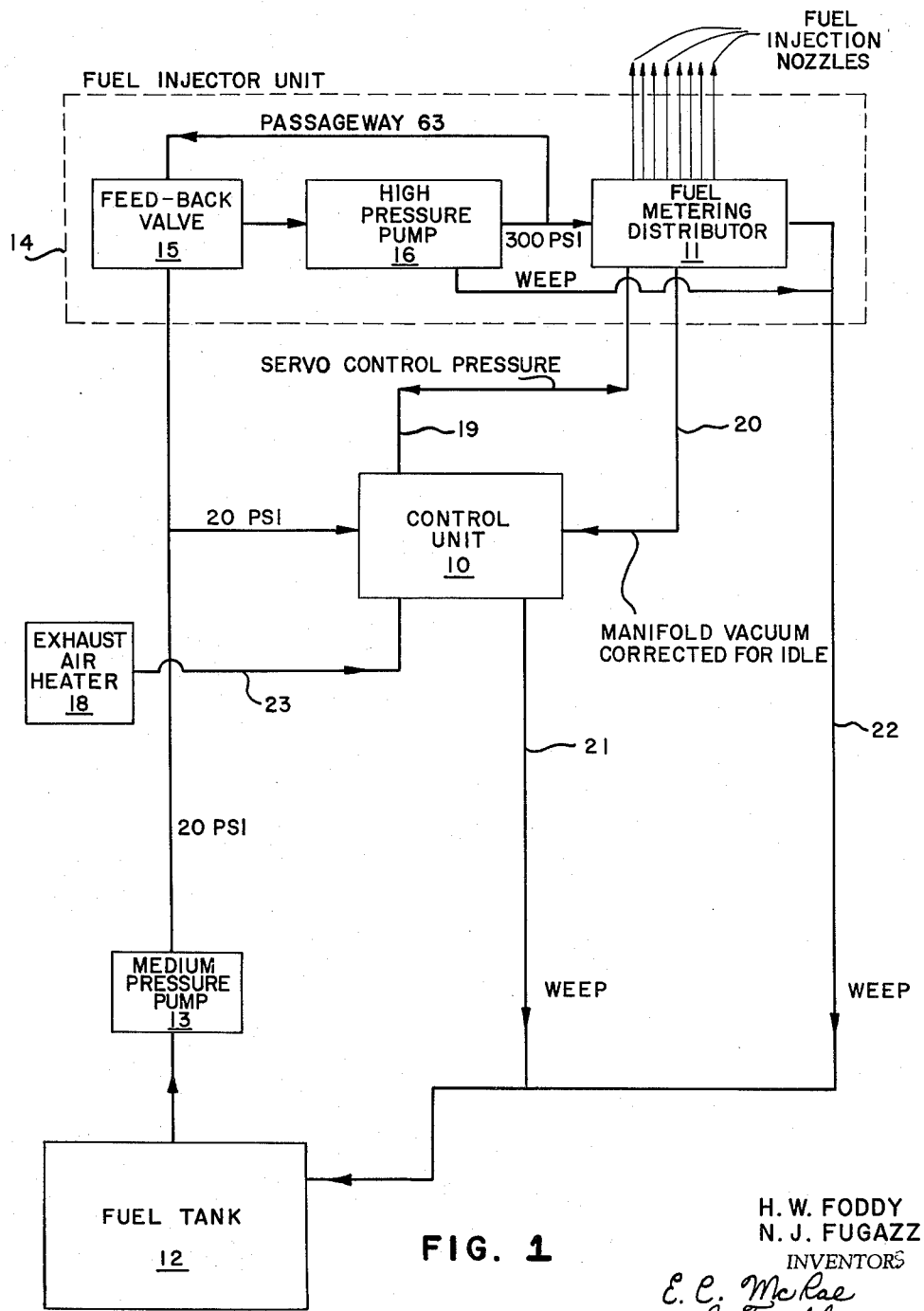
Figure 2:
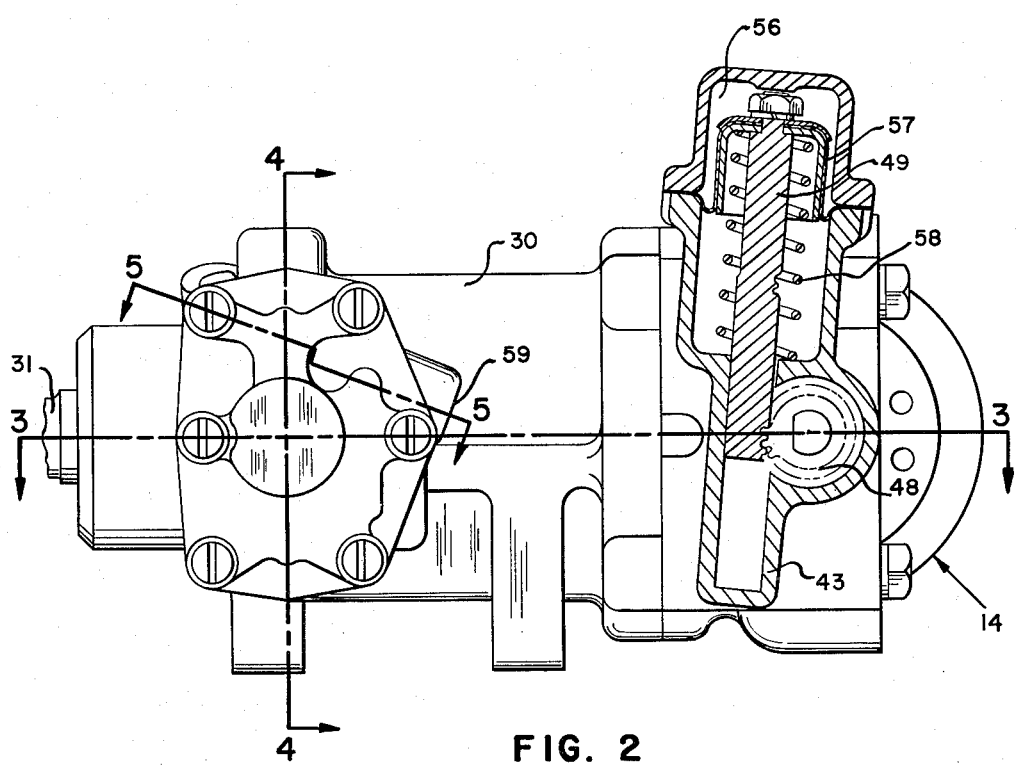
Figure 5:
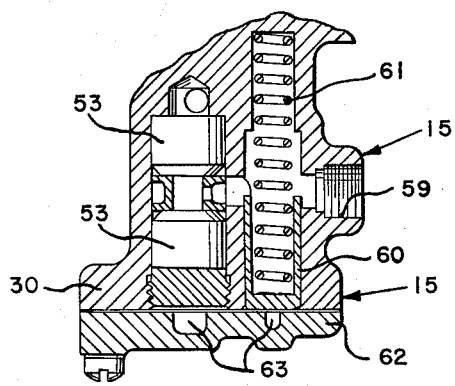
Figure 3:
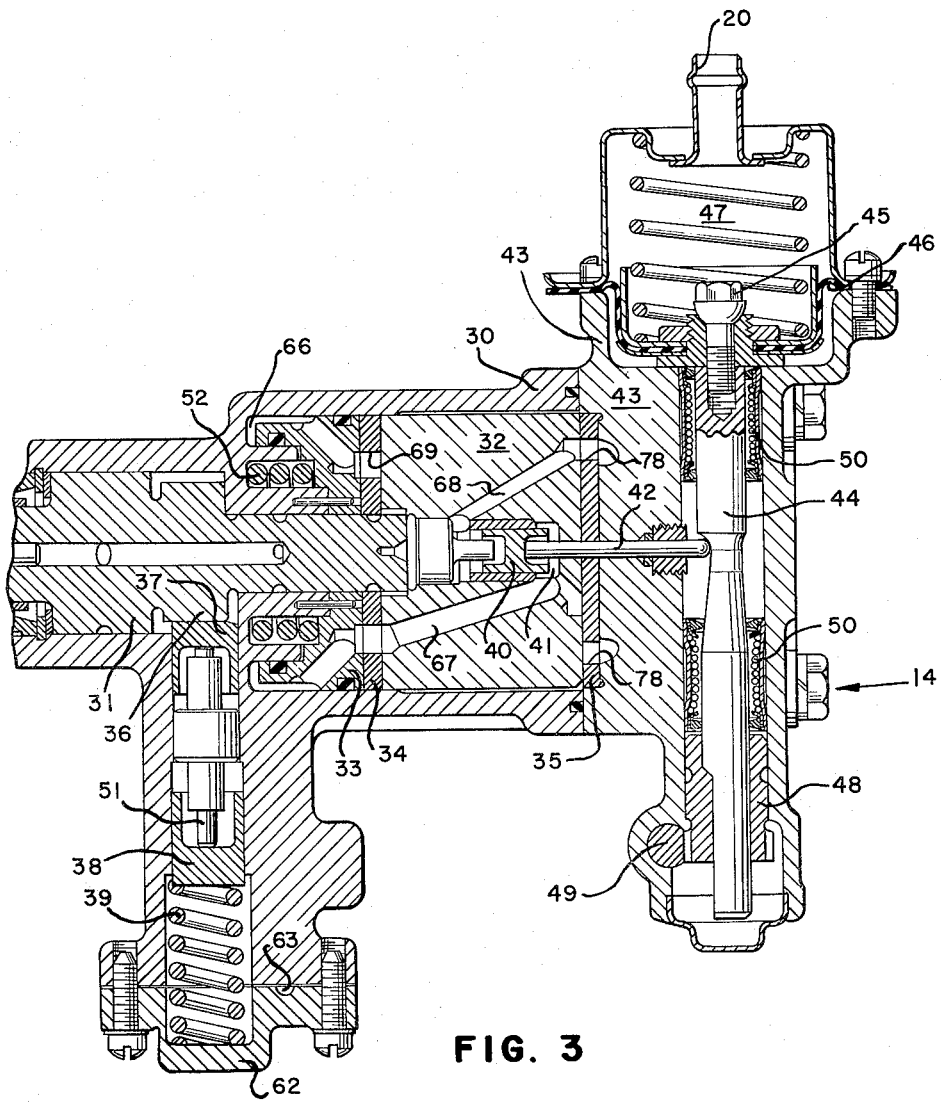
Figure 4:
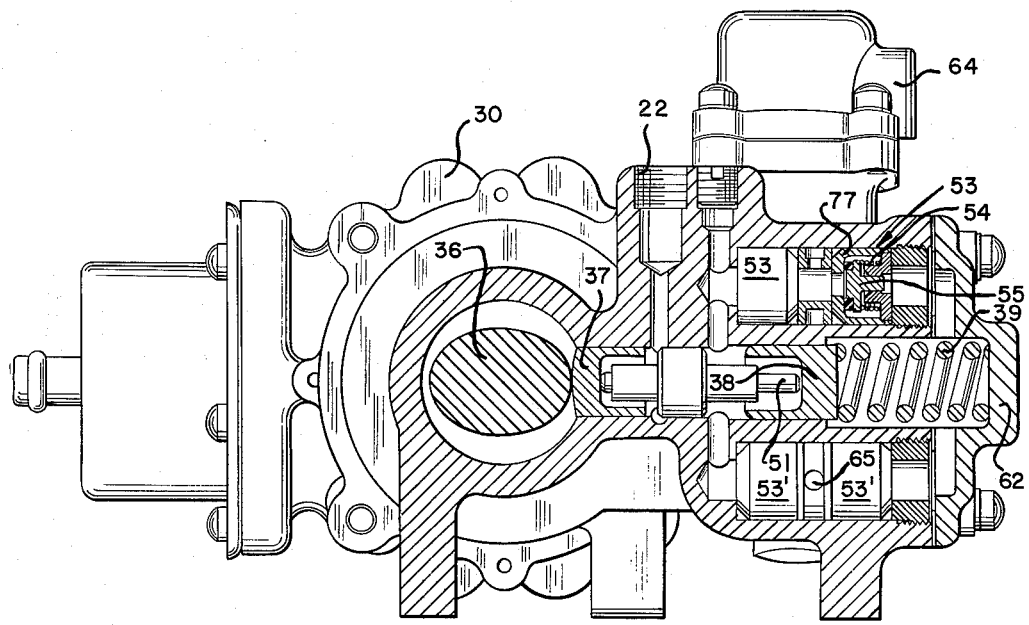
Figure 16:
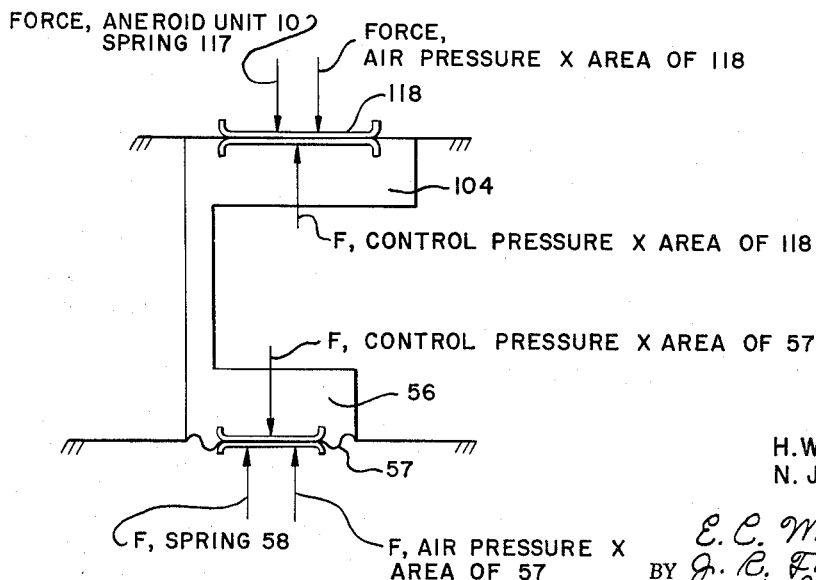
Figure 10:
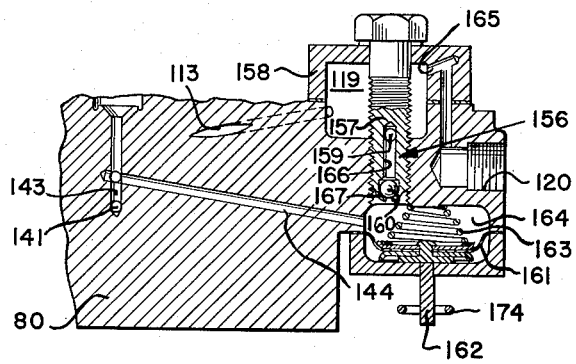
Figure 11:
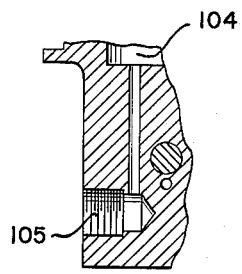
Figure 12:
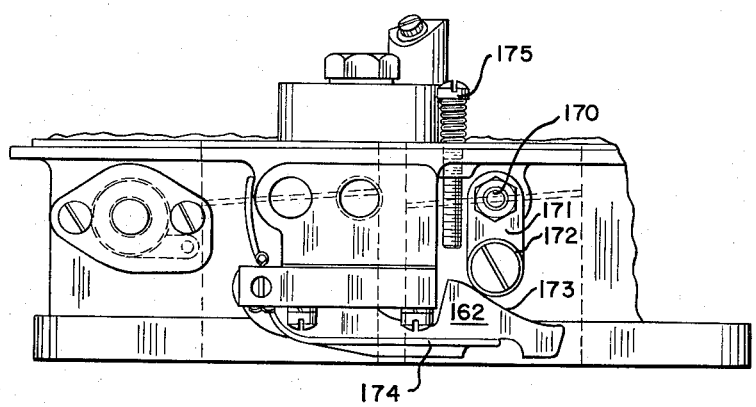
Figure 13:
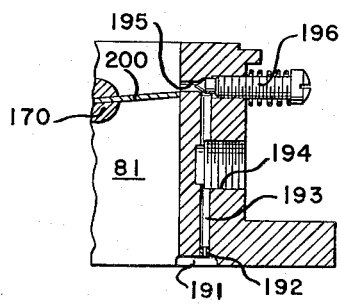
Figure 17:
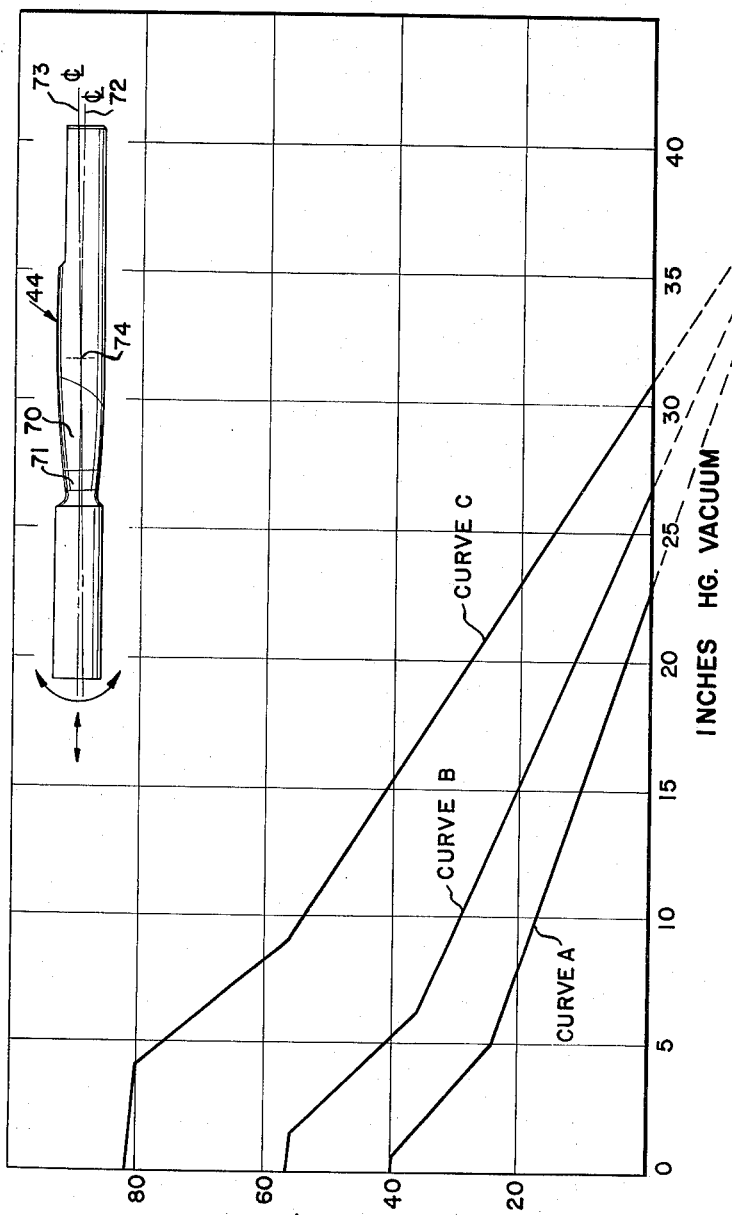

These and other objects and advantages of this invention will become apparent in the following description of embodiment in which:

FIG. 1 is a system diagram;
FIG. 2 is a plan view partially in section of the fuel metering distributor;
FIG. 3 is a sectional view of the distributor taken along line 3—3 of FIG. 2;
FIG. 4 is another sectional view of the distributor showing the high pressure pump taken along line 4—4 of FIG. 2;
FIG. 5 is a partial section showing the feedback valve taken along line 5—5 of FIG. 2;
FIG. 6 is a top view of the control unit;
FIG. 7 is a partial side view of the control unit showing the throttle linkage;
FIG. 8 is a partial sectional view through the control unit taken generally along line 8—8 of FIG. 6;
FIG. 9 is another sectional view taken along line 9—9 of FIG. 6;
FIG. 10 is a partial section through the accelerator pump taken along line 10—10 of FIG. 6;
FIG. 11 is a partial section showing the servo pressure outlet taken along line 11—11 of FIG. 6;
FIG. 12 is another partial side view of the control unit showing the accelerator pump linkage;
FIG. 13 is a partial sectional view showing the vacuum signal outlet taken along line 13—13 of FIG. 6;
FIG. 14 is a cross section through a pressure regulating bleed valve;
FIG. 15 is a partial section of the priming nozzle portion of the control unit taken along line 15—15 of FIG. 6;
FIG. 16 is a schematic force diagram of the control pressure servo system; and
FIG. 17 is a graph of the fuel metering curves with an outline of the metering cam superimposed thereon.

The interconnection and arrangement of the several components of this fuel injection system is shown at FIG. 1. A pump 13 draws fuel from tank 12 and supplies fuel to control unit 10 and to fuel injector unit 14 defined within the broken lines. Within unit 14 is contained a high pressure pump 16, pressure regulator feedback valve 15, and fuel metering distributor 11. Distributor 11, in turn, supplies metered quantities of fuel at just the right time to the several fuel injection nozzles. Weep line 22 returns fuel which has been bypassed in the fuel injector unit 14 to tank 12. Weep line 21 returns fuel from control unit 10 to tank 12 after the pressure thereof has been spent in performing certain servo functions, as will be explained in connection with the control unit.

An exhaust air heater 18 supplies heated air to the control unit, the temperature of which is taken as an indication of engine temperature. The control unit 10 supplies signals to the injector unit 14 through two lines—19 and 20.

The fuel injector unit

A shuttle-piston type of high pressure metering injector is utilized wherein the movement of a shuttle or free piston is controlled and limited to determine the precise amount of fuel distributed to the several fuel injectors.

Referring particularly to FIGS. 2 and 3, the fuel injector unit 14 has a body portion 30 in which a shaft 31 is rotatably carried. Shaft 31 includes an eccentric cam 36 which, in turn, drives cam follower 37 which is reciprocally received in body 30. Cam follower 37, in turn, drives push rod 51 against which pump piston 38 is firmly held by pump spring 39. This arrangement comprises the high pressure pump portion 16 shown in block form in FIG. 1.

A fuel inlet 59, shown in FIGS. 2 and 5 supplies fuel to a pair of identical inlet check valves 53 through a feedback valve 15 shown in FIG. 5. Feedback valve 15 includes a spring loaded regulating piston 60 reciprocally mounted within body 30 and operable to restrict the effective area between inlet 59 and inlet check valves 53. High pressure from the outlet side of the pump is carried through passageway 63, defined in pump cover plate 62, and admitted to the back side of piston 60 as shown in FIG. 5 in the fully opened position. The high pressure on the back side of piston 60 is balanced by the force of pressure regulating spring 61 to regulate the outlet pressure of the pump by restricting the quantity of inlet fuel admitted through feedback valve 15.

FIG. 4 clearly shows the relationship of inlet check valves 53 and outlet check valves 53'. Also, there is included a section through one of these valves which may be taken as representative of all of the valves wherein a body portion 77 reciprocally carries a valve closure member 55 that is spring loaded by spring 54.

This arrangement is, therefore, a double-acting, high pressure pump which supplies fuel for admission to alternate sides of the shuttle piston. It is recognized, of course, that a certain amount of fuel will leak past push rod 51 and, therefore, as shown in FIG. 4, a low pressure weep 22 is provided whereby this fuel may be returned to the fuel tank.

An outlet passageway 65 conducts the fuel out of the high pressure side of the pump between check valves 53' into the fuel distributing portion of this unit. This high pressure fuel is then applied to the cavity 66 on the back side of pressure plate 33 as shown in FIG. 3. Pressure plate 33 is, therefore, pressure loaded by the high pressure outlet of pump 16 and is also mechanically preloaded by preload spring 52. The pressure from plate 33, therefore, provides a fluid seal between the inlet metering plate 34, metering sleeve 32, and outlet metering plate 35.

Shaft 31 is splined to rotatably drive metering sleeve 32. Axially defined within sleeve 32 is the free piston cavity 41 and free piston 40 reciprocally received therein. Sleeve 32 defines a pair of inlet passageways 67 (only one of which is shown in FIG. 3) which are operable to alternately supply high pressure fuel to either side of piston 40 through the inlet metering plate 34 upon the rotation of metering sleeve 32. Also, defined in sleeve 32 is a pair of outlet passageways 68, one of which is shown in FIG. 3, and which are operable to alternately provide escape for the fluid on either side of piston 40 upon the renewed application of high pressure fuel to the other side through an inlet passageway 67.

The movement of the shuttle piston 40 is controlled by push pin 42. The position of push pin 42 is, in turn, determined by its position on metering cone 44. The arrangement of the free piston within the metering sleeve and the arrangement for inlet and outlet metering through the ends thereof is fully shown and described in a co-pending application, Serial No. 622,973, filed Nov. 19, 1956, entitled "Fuel Injection System," in the name of Paul Braun and assigned to the assignee of this invention and now Patent No. 2,935,060, granted May 3, 1960.

Push pin 42 is reciprocally carried in upper body portion 43. Traverse to pin 42 and reciprocally and rotatably carried therein is the metering cone 44. Cone 44 is conveniently carried between a pair of ball bushings 50 in order that the axial and rotational movement of said cone, as will subsequently be described, may be effected with a minimum of hysteresis.

The axial movement of cone 44 is affected by bellows diaphragm 46, secured by bolt 45 to one end of cone 44. Bellows diaphragm 46 is subjected to the pressure in vacuum chamber 47 which is in communication with a source of manifold vacuum through line 20. Therefore, a signal is applied to metering cone 44 which is a function of engine load in accordance with manifold vacuum as applied to vacuum chamber 47.

A second set of operating parameters or conditions is fed into the device by the rotation of metering cone 44. A pinion gear 48 is received on metering cone 44 and is axially slidable therewith to permit the axial movement of cone 44 but which, when driven by rack 49, causes the rotation of cone 44. As best seen in FIG. 2, rack 49 is terminated by a servo bellows 57. Bellows 57 responds to pressure within servo pressure chamber 56, which chamber has a control pressure inlet 64 shown in FIG. 4. Inlet 64 receives a control pressure from control unit 10 through lead 19 as shown in FIG. 1. A spring 58 is positioned to oppose the pressure within chamber 56 and thereby bring the rack 49 into a state of pressure equilibrium in accordance with the pressure applied into chamber 56 by control unit 10.

As will be subsequently shown in connection with the detailed description of the control unit 10, a fluid pressure is computed therein, the value of which is a function of barometric pressure, air temperature and engine temperature whereby the amount of fuel which is metered by the fuel metering distributor 11 is a function of each material variable that affects the engine's fuel requirements. Cone 44 is cam ground with a metering contour especially selected for the accomplishment of this purpose, the contour of which will be subsequently detailed.

In the operation of the fuel metering distributor, shaft 31 is preferably driven at cam shaft speed by the engine which causes metering sleeve 32 to rotate therewith. High pressure pump 16, upon the reciprocation of pump piston 38, supplies fuel at approximately 300 p.s.i. to cavity 66 on one side of pressure plate 33. The pressure thereby placed upon this plate causes it to bear to the right against inlet metering plate 34 whence the pressure is transmitted through metering sleeve 32 to outlet metering plate 35 thereby providing a seal between the relatively rotating components. As shown in FIG. 3, a pair of inlet ports 69 are provided in inlet plate 34 and are registerable with inlet passageways 67 upon rotation thereof. These, therefore, place the high pressure outlet from pump 15 alternately on opposite sides of free piston 40 whence fuel therefrom is alternately ejected through outlet passageway 68 and through corresponding outlets 78 defined within outlet metering plate 35. The extent of movement of the free piston 40 is controlled by the position of cam 44 which, in turn, is controlled by the manifold vacuum in chamber 47 and the control pressure in chamber 56.

The control unit 10

Control unit 10 may be conveniently mounted on an engine's intake manifold and thereby provide a means for the control of the quantity of air which is admitted into the intake manifold in the manner of the throttle body portion of a carburetor. Control unit 10 performs several functions, one of which is to provide a source of pressure-regulated liquid for the control of the rack and pinion servo bellows 57 within the fuel injector 14. Another function of the control unit is to provide an accelerator pump which directly injects a quantity of raw fuel into the intake manifold upon sudden increase in engine load to compensate for the inherent time lag in a fuel injection system. A further function of the control unit 10 is to provide raw priming fuel directly into the intake manifold during the cranking of the engine in amounts which are related to engine and ambient air temperature. Another function of the control unit is to provide a fast idle arrangement which is infinitely variable with temperature within its intended range. An anti-stall arrangement is also provided which automatically admits additional air into the intake manifold upon condition of imminent engine stall which has the immediate effect of increasing the quantity of injected fuel so as to avert a stall.

The fast idle function

Referring to FIG. 6, body 80 provides an annular filter seating ring 110 upon which a filter element may be placed. Primary induction openings 81 and secondary openings 81' are controlled by throttle linkage 82 in the well-known manner.

The primary induction openings 81 are employed to provide air to the cylinders of the internal combustion engine in which this fuel injection system may be employed in the well known and conventional manner. For example, one of the primary induction openings 81 may feed a set of four of the cylinders of an eight cylinder engine, and the other primary induction opening may be employed to feed the other set of four cylinders. The secondary openings 81' which may come into play during high acceleration conditions, are also arranged so that one of the secondary openings 81' feeds one set of four cylinders, and the other secondary opening 81' feeds the other set of four of the cylinders in an eight cylinder engine.

Referring to FIG. 8, there is seen a partially broken away section through control unit body 80 in which a thermostat 84 is threaded therein. The capsule 108 surrounding thermostat 84 receives heated air through lead 23 from the exhaust stove heater 18 as shown in FIG. 1. Thermostat 84 may be of the kind which reacts to a change in state of matter from a solid to a liquid as fully described in U.S. Patent Nos. 1,656,369, 1,696,929, and 2,580,820. The material within thermostat 84 expands or contracts to axially move push pin 85 in accordance with the engine's temperature. This movement of pin 85 is translated to link 91 which has an eye portion 92 at one end mounted for rotation about pin 90. Link 91 has a roller 93 received therein at its other end, and in accordance with the movement of pin 85, roller 93 reciprocates within a pair of cam slots 94 formed within yoke 88. In the illustration shown, pin 85 is in its most extended position corresponding to a fully warmed engine.

Link 91 translates the movement of pin 85 to plunger 95. Threaded on plunger 95 is fast idle air valve 83 reciprocally received within body 80 and guided by guide pin 96. The axial movement of air valve 83 serves to either cover or selectively uncover air annulus 102 formed within body 80 to selectively admit increased quantities of air with decreasing engine temperature into the manifold through manifold opening 103 from filtered air entrance opening 109.

A plunger return spring 97 is interposed between valve 83 and cap screw 111 which maintains contact between roller 93 and plunger 95. An access plug 98 is received coaxially within cap screw 111 whereby the position of sleeve valve 83 on plunger 95 may be adjusted by the rotation of plunger 95 thereby providing a means for adjusting the amount of excess air for fast idle which will be admitted during the operation of a cold engine. In a fully warmed engine as shown, valve 83 is closed.

The servo control function

As mentioned heretofore, liquid pressure is used for the control of the rack and pinion servo in the fuel metering distributor. Such liquid pressure is received at opening 106 within body 80 of the control unit 10, as shown in FIG. 9, from fuel pump 13. Here, fuel at approximately 20 p.s.i. is applied to pressure regulating valve 114 and to primary passageway 107 to the priming circuit, the function of which will be subsequently explained. Valve 114 bleeds fuel into control chamber 104, which chamber is in communication with chamber 56 of the rack and pinion servo through outlet opening 105 (FIG. 11) and through lead 19 (FIG. 1).

A restricted bleed orifice 112 is interposed between control chamber 104 and bleed passageway 113 across which a pressure differential may be formed in accordance with the quantity of fuel admitted into chamber 104 by valve 114. Bleed passageway 113 is in communication with reservoir 119, as shown in FIG. 10, and there the fuel is returned to the fuel tank through outlet 120 and fuel return line 21.

As stated before, the pressure within chamber 104, and thus the pressure applied to the rack and pinion servo, is a function of engine temperature, and air pressure and temperature. An arrangement which accomplishes this is shown in FIG. 8. It was stated in connection with the fast idle air bleed that thermostat 84 is responsive to engine temperature and that the movement of its push pin 85 causes the displacement of link 91. A yoke 88 is provided having substantially parallel sides between which link 91 moves. Within yoke 88 is formed a pair of cam slots 94, and the roller portion 93 of link 91 is adapted to reciprocate within these cam slots upon the movement of push pin 85. The movement of push pin 85 with increasing engine temperature causes link 91 to bear down upon rocker 89. The force thus applied will be transmitted through rocker face 122 to threaded stud 121 of aneroid unit 86. This force will cause the downward movement of stud 121 until lock nuts 123 are bottomed against yoke 88. Thereafter, any further movement of link 91 will only cause the movement of plunger 99 through yoke 88 against spring 100. A pair of lock nuts 101 are threaded on plunger 99 and serve to provide a means for the adjustment of the usable length thereof.

Aeroid unit 86 itself may either expand or contract in accordance with the pressure differential between the inside and the outside thereof. The aneroid unit, being located above the intake manifold and preferably within the filter unit, not shown, is constantly subjected to the pressure and temperature of ambient air. A quantity of nitrogen is sealed therein in order to make the unit temperature, as well as pressure, sensitive.

The force on diaphragm 118 exerted by the aneroid unit 86, either by expansion, contraction, or transmittal of the temperature signal from face 122, will cause valve 114 to open to seek a balance with the fluid pressure within control chamber 104. Diaphragm 118 includes rivet 124 in contact with pintle 115 of valve 114, and operable to open the pintle to admit fuel under pressure from fuel inlet 106 into control chamber 104. Valve 114 (FIG. 14) simply contains a pintle 115, forming with body 125, a valve seat held normally closed by spring 117. Pintle is guided by guide pin 116. Therefore, thermostat 84 and aneroid unit 86 act together to bleed liquid under pressure into control chamber 104, the pressure of which is developed across pressure restriction 122, to position diaphragm 57 of the rack and pinion servo.

The relationship of the forces which apply to this servo system can most readily be understood with reference to the static force diagram shown in FIG. 16. The force of the aneroid unit 10 is shown as applied to one side of diaphragm 118 which includes the force of the temperature compensation, if any, and the force due to the expansion or contraction of the unit itself. Added to this is the force of the product of air pressure and the area of the diaphragm exposed to the air. These are balanced by the pressure within the control chamber 104 multiplied by the area of diaphragm 118. At the servo end of the force diagram, the control pressure within servo chamber 56 acts upon one side of bellows diaphragm 57. The affect of changes in ambient air pressure and the product of the air pressure and the area of diaphragm 57. The effect of changes in ambient air pressure can be either canceled or controlled by controlling the exposed areas of diaphragms 118 and 57. Hence, the affect of air pressure on the aneroid unit will be the controlling influence for the fuel compensation that may be desired relative to the change in air density.

The precise quantity of fuel that is distributed to the injectors at any given time is a function of the position of the metering cone 44. The cone's profile is determined by the characteristic of a fuel metering curve within the quantity of injected fuel is plotted against load. A typical set of curves is shown in FIG. 17. The quantity of injected fuel in mm.$^3$/intake stroke is plotted on the axis of ordinates and the intake manifold vacuum is plotted on the axis of abscissas. The characteristic metering curve has essentially two straight-line portions, the longer of which represents the gradient of fuel requirements as against engine load for part load operating conditions, and the steeper of which represents an increased rate of enrichment for heavy load conditions. A profile of the metering cone itself is also shown wherein portions 70 and 71 represent the stepped portions of the cam profile.

Curve "A" and "C" represent examples of the maximum and minimum effect upon the metered fuel quantity brought about by the rotation of cone 44. As stated before, the cam profile thereon may be cam ground to have a centerline 73 offset from the centerline 72 of the cone itself. The point of intersection 74 of the centerlines may be arbitrarily chosen in accordance with the particular requirements of the engine involved, as its location represents a compromise. For the purpose of illustration and explanation, this intersection point is taken at 40" Hg of vacuum, a theoretical point. The affect upon the injected fuel quantity due to rotating the cone through 180° is equivalent to swinging a metering curve about this intersection point between curves "A" and "C." Curve "C," therefore, represents the maximum compensation that would be provided a cold engine at sea level, and curve "A" represents the compensation at 10,000 feet, 0° F., ambient temperature. Intermediate to these lies curve "B" which represents the compensation provided for sea level, 125° F. ambient temperature.

With regard to the compromise selection of some intersection point 74 for the centerline 73 of the cam ground profile with centerline 72 of the cam, this fact is appreciated when we remember that theoretically, for altitude compensation alone, it would be most desirable to effect a purely parallel shift of the metering curve, (that is, to rotate the curve about infinity) since, at increased altitude, the manifold requires a uniformly decreased absolute pressure to obtain the same charge of air that it obtains at the lower altitude. However, for temperature compensation, that is, for the increased fuel required for decreased engine operating temperatures, it is desirable to rotate the metering curve about the point of absolute vacuum, approximately −29.9″ Hg. Therefore, this arrangement permits a compromise which quite adequately reproduces the theoretical engine requirements in a practical manner over a variety of engine operating conditions.

The priming function

One of the functions of an integrated fuel system is the supply of priming fuel to an engine in quantities sufficient to produce reliable engine starts over a wide range of temperatures. This fuel is supplied to the intake manifold directly through the primary induction openings 81 in the control unit 10 where it then may be drawn into the cylinders. Positive pressure priming is employed and, therefore, the necessity of venturi feeding is obviated.

Referring to FIG. 9, fuel from pump 13 enters the control unit 10 at opening 106, and pressurizes primary fuel passageway 107. Terminating this passageway is variable priming valve 126. Valve 126 is identical in structure to the servo control pressure regulating valve 114, FIG. 14. Valve 126 is operable, upon being opened by push pin 131, to admit fuel into priming chamber 127. Push pin 131 is carried by diaphragm 128 which forms one wall of chamber 127. As perhaps is best shown in FIG. 6, a bimetal spring thermostat 129 is secured at one end to body 80 by a pair of screws 148. In this position, bimetal spring 129 is subject to both engine heat and ambient air temperature, and since the primer is only operative during engine starts, it provides an accurate indication of the priming fuel requirements of the engine. Tensioning arm 150 and adjusting screw 149 provides a means by which the initial position of bimetal spring 129 may be adjusted.

An enabling solenoid 135 normally holds the bimetal spring 129 retracted from diaphragm 128, as shown. Solenoid core and support 138 is secured to body 80 by means of bolts 139. Upon the energization of the solenoid through leads 140 concomitant with the energization of the starter circuit, solenoid 135 draws up armature 136 carried on a non-ferrous connecting bolt 137. Secured to the other end of bolt 137 is spring retractor 130, which is driven, upon actuation of the solenoid, to bottom upon abutments 133 of diaphragm retainer 132. This action also compresses retraction spring 151 into its annular retaining groove 134, and bimetal thermostat spring 129 is free to bear upon push pin portion 131 of diaphragm 128 with a force which increases with decreasing engine temperature. The force of bimetal spring 129 upon diaphragm 128 is balanced by the fluid pressure within priming chamber 127 in such a manner that decreasing engine temperature results in increased priming pressure.

Priming chamber 127 is in communication with a pair of priming nozzles 152 through priming passageway 141, vertical passageway 143, and weighted check valve 145. Weighted check valve 145 is reciprocally carried in primer nozzle housing 146, and carries thereon a circular sealing gasket 153 which is registerable with an annular land portion 154 at the terminus of vertical passageway 143. A spring 147 is interposed between valve 145 and nozzle housing 146 to assist in the closing action of the valve.

The function of check valve 145 is to provide a relatively low bias which must be overcome by the pressure within priming chamber 127 before priming occurs. Since the accelerator pump operates through these nozzles, the connection being made within body 80 by the intersection of passageways 144 and 143 (FIG. 10), and since the accelerator pump is of the flow-through type wherein a nominal pressure of a few p.s.i. is maintained, it is necessary to insert a bias, such as by this valve, to prevent flow through the nozzles 152 except when specifically demanded by accelerator pump action or priming action.

A pair of nozzles 152 receive fuel from the outlet side 155 of valve 145 and are arranged to discharge into the primary induction openings 81 above the throttle plates. FIG. 15 shows this arrangement for one priming nozzle. Fuel pressure at these nozzles caused by the action of spring 129 against diaphragm 128 is removed upon de-energization of solenoid 135, such as concomitant with opening the starter circuit of the engine, thereby permitting spring retractor loop 130 to withdraw spring 129 under the influence of retractor spring 151.

The accelerator pump function

The accelerator pump, shown in FIG. 10, receives fuel from the bleed passageway 113 of the servo control chamber 104 through reservoir 119 and check valve 156. A bolt 157 secures cap 158 to body 80 and therein forms reservoir 119 having discharge conduit 165 in communication with weep outlet 120.

Accelerator pump check valve 156 is formed within bolt 157. A passageway 166 is drilled coaxially within the bolt and is terminated at a radially drilled opening 159 in communication with reservoir 119. A second and larger opening is coextensive with passageway 166 and forms therewith a ball retaining seat with ball 160. The end of the bolt is cross-cut to provide a plurality of ball retaining fingers 167 which serve to retain ball 160 within its seat. In the open position, as shown, fuel may pass down through valve 156 into accelerator pump cavity 164. Upon the actuation of the pump diaphragm 161 against spring 163 by lever 162, a portion of cavity 164 is displaced, and the fuel therein is forced through accelerator pump passageway 144 to vertical passageway 143 where it is applied to the priming nozzles 152 through weighted check valve 145.

The accelerator pump is operator-actuated in the well-known manner, and a mechanism for effecting this pumping action is shown in FIG. 12. Prime throttle shaft 170, connected to throttle link 82 in FIG. 7, when caused to rotate, carries extension arm 171, upon which roller 172 is eccentrically carried, to coact with cam surface 173 of arm 162. A mousetrap spring 174 is carried by arm 162 which maintains the cam surface 173 in contact with roller 172. The extent of total movement of arm 162, and, therefore, the quantity of fuel provided per stroke of the accelerator pump, is limited by adjustable stop screw 175.

The anti-stall function

Body 80 defines a chamber 182 which is in communication with the intake manifold at some point below the throttle plates 200 within primary induction opening 81 through opening 190, as shown in FIG. 9. Therefore, chamber 182 is subjected to manifold pressures. A cover plate 183 carries a rubber gasket 184 and is normally drawn down over chamber 182 due to the decreased pressure therein. Cylinder 186 is reciprocally received in bridged support 180. Support 180 is secured to body 80 by screws 181.

Cylinder 186 is internally threaded and carries plate 183 in abutment thereto at one end thereof, secured thereto by screw 189, so that cylinder 186, plate 183, and gasket 184 move as a unit. A coil spring 187 is received over cylinder 186 and in abutment with the top surface of support 180. An outer cylinder 185 is slidably received over cylinder 186 on top of spring 187 and is secured to cylinder 186 by an adjustment screw 188 threadably received in the uppermost end of cylinder 186. Spring 187, being compressed between support 180 and outer cylinder 185, urges the assembled unit to move upward, thereby withdrawing cover plate 183 from chamber 182. The amount of compression of spring 187, determined by the amount by which screw 188 has driven outer cylinder 185 over cylinder 186, determines the force by which cylinder 186 tends to raise cover plate 183.

In the operation of the anti-stall device, assuming the engine is operating, the manifold vacuum will hold cover plate 183 and its gasket 184 to seal the opening to chamber 182. However, should the engine, when idling, begin to stall under such conditions that the stall could be averted by adding additional air to the intake system, the manifold vacuum will decrease to the point where cover plate 183 is released and additional air will immediately enter the manifold through opening 190. This arrangement has particular advantage in a fuel injection system, since the fuel metering distributor, being controlled by a vacuum signal, will immediately add whatever fuel is necessary to provide a combustible mixture. The operation of this anti-stall device, in admitting additional air upon low manifold vacuum, is equivalent to opening the throttle plates by a small amount. The extent by which cover plate uncovers chamber 182 may be controlled by controlling the thickness of the plate 183.

*The idle control function*

As shown in FIG. 1, the control unit 10 supplies a manifold vacuum signal to the fuel metering distributor through lead 20. FIG. 13 shows the origin of this signal. A routed portion 191 is formed to communicate with a primary induction opening 81 and provides a vacuum signal to passageway 193 through restriction 192. Opening 195 is formed within body 80 to be uncovered and subjected to atmospheric pressure when the throttle plate 200 is in the idle position, as shown. An idle adjust screw 196 is positioned to control the opening of opening 195 to control the amount of air bled therethrough during the time when the opening is uncovered. Vacuum exit 194 is in communication with passageway 193 and is connected to lead 20, FIG. 1, to provide a signal to the vacuum control chamber 47 which is the resultant of the actual vacuum and the decrease in vacuum due to the air bleed through opening 195, creating a pressure differential across restriction 192.

An idle bleed arrangement, such as shown, is desirable with vacuum controlled fuel injection systems, to bleed down the relatively high vacuum at idle, in order to provide an adjustable means for increasing the quantity of fuel which would otherwise be provided to the injectors, to compensate for dilution due to valve overlap and other factors that require additional fuel at idle. As soon as throttle 200 is opened, bleed opening 195 is subjected to a substantially decreased pressure, and will, therefore, become inoperative.

What is claimed is:
1. In a shuttle-piston fuel metering system for an internal combustion engine, means for limiting the movement of said shuttle piston, said means including a fluid servo motor, a source of fluid under pressure, a pressure relief valve, said fluid servo motor connected to receive fluid pressure through said valve, and valve operating means responsive to engine fuel requirements and operable to cause said valve to admit fluid pressure to said servo motor in accordance with said fuel requirements.

2. In a fuel injection system, a metering unit including a fluid servo motor operable to vary the quantity of injected fuel, a throttle body including a controllable pressure regulating valve, said valve including a control member operable to control said valve, a source of servo-operating fluid under pressure, said servo motor connected to said source through said valve, a thermostat responsive to engine temperature having one end fixed to said throttle body and another end movable with respect thereto in accordance with engine temperature, an aneroid bellows unit interposed between the movable end of said thermostat and the control member of said valve and operable upon movement thereof to move said member whereby the movement of said thermostat is carried through said bellows unit to said control member.

3. An internal combustion engine starting primer comprising a source of engine fuel under pressure, a controllable valve, a priming nozzle arranged to discharge fuel into an induction portion of said engine, said nozzle in communication with said source through said valve, thermostat means responsive to engine temperature and operable to open said valve in increasing amounts with decreasing engine temperature, and means operable to remove the fuel pressure at said nozzle upon starting of the engine.

4. An internal combustion engine starting primer comprising a source of engine fuel under pressure, a controllable valve, a priming nozzle arranged to discharge fuel into an induction portion of said engine, said nozzle in communication with said source through said valve, thermostat means responsive to engine temperature and operable to open said valve in increasing amounts with decreasing engine temperature, and electric solenoid means operable to remove fuel pressure from said nozzle upon the starting of the engine.

5. In a fuel injection equipped engine wherein a manifold supplies air to engine cylinders through an air control valve, an anti-stall device comprising a check valve, said check valve defining a first opening in communication with air at atmospheric pressure and a second opening in communication with said manifold between said control valve and the engine cylinders, said check valve normally held in the closed position by the difference between the manifold and atmospheric pressures, and bias means operable to open said check valve upon a predetermined maximum manifold pressure to admit air into said manifold.

6. In a fuel injection equipped engine having an air induction manifold, means defining a passageway having one end opened into said manifold and another end opened into air at atmospheric pressure, passageway closure means in a flow stoppable position and having a member normally acted upon by the pressure within said manifold to hold said means in a closed position, and bias means effective to cause said member to open said closure means when the pressure within said manifold rises to a predetermined value.

7. In a fuel injection system, a servo motor operable to vary the quantity of injected fuel, a source of servo operating fluid under pressure, a control unit having a chamber, said chamber being in communicating with said servo motor, a controllable pressure regulating valve positioned in said control unit between said source and said chamber, means responsive to ambient air temperature, ambient air pressure and engine temperature for controlling the position of said valve, and means communicating with said chamber for draining off a quantity of the fluid in said chamber whereby the pressure of the fluid at said servo motor is a function of the position of said valve.

8. In a fuel injection system, a servo motor operable to vary the quantity of injected fuel, a source of servo operating fluid under pressure, a controllable pressure regulating valve, said controllable pressure regulating valve developing a pressure which is a direct function of the position of the valve, said servo motor connected to said source through said valve, and means responsive to engine temperature and ambient air density for controlling the position of the valve.

9. In a fuel injection system, a servo motor operable to vary the quantity of injected fuel, a source of servo operating fluid under pressure, a controllable pressure regulating valve providing a continuously variable area orifice, said controllable pressure regulating valve developing a pressure which is a function of the instantaneous area of said orifice, said servo motor connected to said source through said valve and orifice, and means responsive to ambient air temperature connected to said valve for controlling the movement of said valve and the area of said continuously variable area orifice in accordance with ambient air temperature.

10. In a fuel injection system, a servo motor operable to vary the quantity of injected fuel, a source of servo operating fluid under pressure, a controllable pressure regulating valve providing a continuously variable area orifice, said controllable pressure regulating valve developing a pressure which is a function of the instantaneous area of said orifice, said servo motor connected to said source through said valve and orifice, and means responsive to ambient air pressure connected to said valve for controlling the movement of said valve and the area of said continuously variable area orifice in accordance with ambient air pressure.

11. In a fuel injection system, a servo motor operable to vary the quantity of injected fuel, a source of servo operating fluid under pressure, a controllable pressure regulating valve providing a continuously variable area orifice, said controllable pressure regualting valve developing a pressure which is a function of the instantaneous area of said orifice, said servo motor connected to said source through said valve and orifice, and means responsive to ambient air temperature and ambient air pressure connected to said valve for controlling the movement of said valve and the area of said continuously variable area orifice in accordance with ambient air temperature and ambient air pressure.

12. In a fuel injection system for an internal combustion engine, that improvement comprising a fluid-pressure controlled servo motor operable to vary the injected fuel quantity, a source of fluid under pressure, a control unit having a chamber, said chamber being in communication with said servo motor, a source of fluid under pressure, a variable pressure controlling valve means positioned in said control unit between said source and said chamber, said servo motor connected to said source through said means and said chamber, an expansible sealed bellows exposed to ambient air and having one end relatively movable with respect to the other end, said one end being connected to said valve, said expansible sealed bellows being operable upon expansion and contraction thereof to move said valve to controllably admit fluid from said source to said chamber and servo motor in accordance with ambient air pressure and ambient air temperature, and means connected to said valve through said expansible sealed bellows for controlling said valve in accordance with engine temperature.

References Cited in the file of this patent

UNITED STATES PATENTS

| | | |
|---|---|---|
| 2,136,959 | Winfield | Nov. 15, 1938 |
| 2,245,562 | Becker | June 17, 1941 |
| 2,341,257 | Wunsch | Feb. 8, 1944 |
| 2,673,556 | Reggio | Mar. 30, 1954 |
| 2,786,460 | Barford | Mar. 26, 1957 |
| 2,841,129 | Reggio | July 1, 1958 |
| 2,852,011 | Pringham | Sept. 16, 1958 |
| 2,876,758 | Armstrong | Mar. 10, 1959 |